United States Patent [19]
Yata et al.

[11] 3,919,538
[45] Nov. 11, 1975

[54] BRACKET TYPE ELECTRONIC FLASH DEVICE

[75] Inventors: Kotaro Yata, Ikeda; Hiroshi Ueda, Nara, both of Japan

[73] Assignee: Minolta Camera Kabushiki Kaisha, Osaka, Japan

[22] Filed: Feb. 4, 1974

[21] Appl. No.: 438,958

[30] Foreign Application Priority Data
Feb. 9, 1973 Japan.............................. 48-16258

[52] U.S. Cl............. 240/1.3; 240/10.66; 339/88 R; 339/90 C; 339/256 R; 354/145
[51] Int. Cl.².................................. G03B 15/05
[58] Field of Search........ 240/1.3, 2 C, 10.6, 10.61, 240/10.66, 6.4, 51.2, 73 QD; 354/126, 141, 145; 339/88 R, 88 C, 90 R, 90 C

[56] References Cited
UNITED STATES PATENTS

| | | | |
|---|---|---|---|
| 2,383,109 | 8/1945 | Conlan | 339/90 C UX |
| 2,469,857 | 5/1949 | Allyn | 339/90 C UX |
| 2,622,188 | 12/1952 | Seeger et al. | 240/1.3 |
| 2,953,675 | 9/1960 | Kluge | 240/1.3 |
| 3,049,611 | 8/1962 | Kluge | 240/1.3 |
| 3,134,547 | 5/1964 | Kapteyn et al. | 240/1.3 |

*Primary Examiner*—Joseph F. Peters, Jr.
*Assistant Examiner*—Kenneth C. Hutchison
*Attorney, Agent, or Firm*—Wolder & Gross

[57] ABSTRACT

A bracket type electronic flash device alternatively energizable by self contained batteries or an external power source, includes an elongated, grip defining body member provided with a camera supporting bracket. A flash unit is positioned at one end of the body member, and the other end is provided with a first electrical and a first mechanical coupling member. A battery housing case is separably positioned at the body member other end and includes a second mechanical coupling member releasably engaging the first coupling member to separably interlock the body member and battery case, and a second terminal connected to the housed batteries and engaging the first electrical terminal when the battery case is attached to the body member. When an external electrical source is used, the battery case may be detached to reduce the bulk of the device.

5 Claims, 7 Drawing Figures

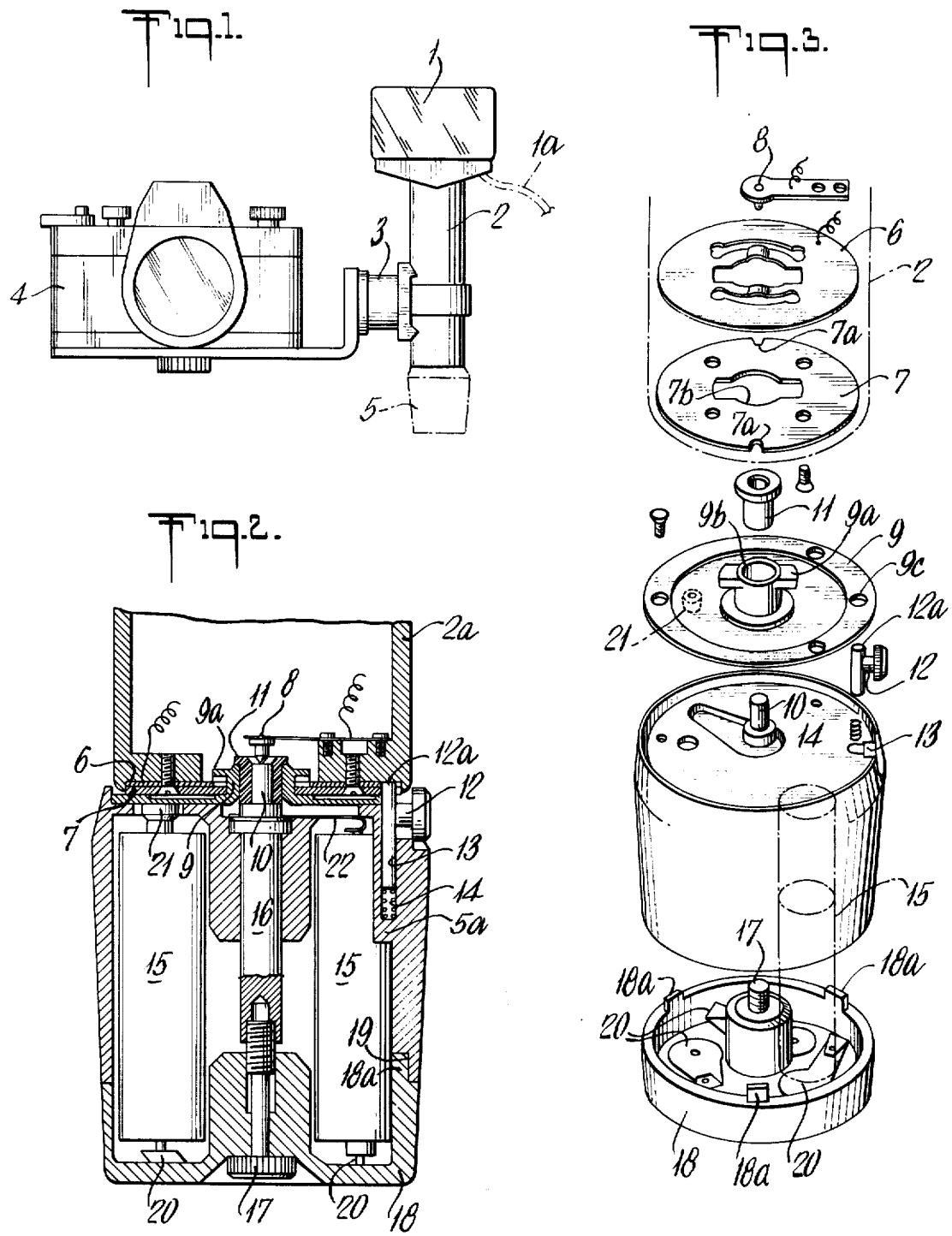

BRACKET TYPE ELECTRONIC FLASH DEVICE

BACKGROUND OF THE INVENTION

The present invention relates generally to improvements in large size electronic flash devices of the type which is attached through a bracket to a camera body, and it relates more particularly to an electronic flash device which contains a battery or batteries therein, but may be operated by means of an external electric power source.

In general, a flash device of the above type consists of a grip and a head portion having a flash light in the front thereof. Such a flash device is coupled to a camera body through a bracket carrying a grip mounted on the device and while providing a large quantity of light, possesses the disadvantage of being of large size. However, when carrying the camera body with the flash device attached, the support of the camera body by a photographer is greatly facilitated because of the provision of the grip, but it affords poor portability, because of the added volume or bulkiness.

Accordingly, it is highly desirable to provide a compact size flash device for such purposes.

The flash device of the subject type employs small self-contained low-voltage dry cells therein as an internal electric power source; it also may be operated by an external electric power source of a high voltage or of large capacity, such as an A.C. power source or layer-built batteries, by using an electric cord or the like, to provide handling convenience. The flash device may be operated with either of the aforesaid two types of power sources, as required.

However, since the internal electric power source is conventionally incorporated in the head portion or grip of the flash device, a further space is required for the internal electric power source to be housed in the flash device, in addition to such an increased volume of the device as has been earlier described, thus failing to decrease the size of the flash device.

SUMMARY OF THE INVENTION

The present invention is based on the finding that an internal electric power source is unnecessary and obstructive in an electronic flash device when an external electric power source is used, and yet occupies considerable space in the device, irrespective of whether it is used or not. According to the present invention, the aforesaid internal electric power source is constructed to be separated from the device and is housed in a separate battery case which may be mounted on or detached from the body of the device. Accordingly, when the external electric power source is used, the battery case may be removed from the body of the device, thereby minimizing the total volume of the device. On the other hand, when the internal electric power source is used, the battery case is mounted on or connected to the body of the device so as to provide an integral construction therewith, and thus the device may be handled in the same manner as the conventional device. According to the present invention the flash device, when the external electric power source is used, may be reduced in volume, thereby decreasing its bulkiness and increasing its portability.

More specifically, a battery case is detachably mounted on the bottom of the grip of the flash device proper, and when the internal electric power source is used, the battery case may be handled as an integral unit with the grip serving as the end portion of the overall grip. On the other hand, when the external electric power source is used, the battery case may be detached from the body of the flash device, whereby the length of the grip is shortened.

It is accordingly an object of the present invention to provide a bracket type electronic flash device of reduced bulk and hence increased portability, or ease in handling.

It is a further object of the invention to provide a flash device of the above type which permits quick and ready attachment and detachment of the battery case to or from the body of the device.

It is a yet further object of the invention to provide a flash device of the subject type in which chattering or looseness between the battery case and the body of the flash device is eliminated.

It is a further object of the invention to provide a flash device of the type described which ensures the proper electrical connection of the battery case with the body of the flash device.

It is a further object of the invention to provide a flash device of the above nature which provides economical or low cost mechanical and electrical connecting means between the battery case and the body of the flash device.

BRIEF DESCRIPTION OF THE DRAWINGS

FIG. 1 is a front elevational view of a first embodiment of the present invention;

FIG. 2 is a fragmentary longitudinal cross-sectional view thereof showing the essential parts of the device;

FIG. 3 is an exploded, perspective view of the essential parts of the first embodiment;

DESCRIPTION OF THE PREFERRED EMBODIMENTS

Figure 4:
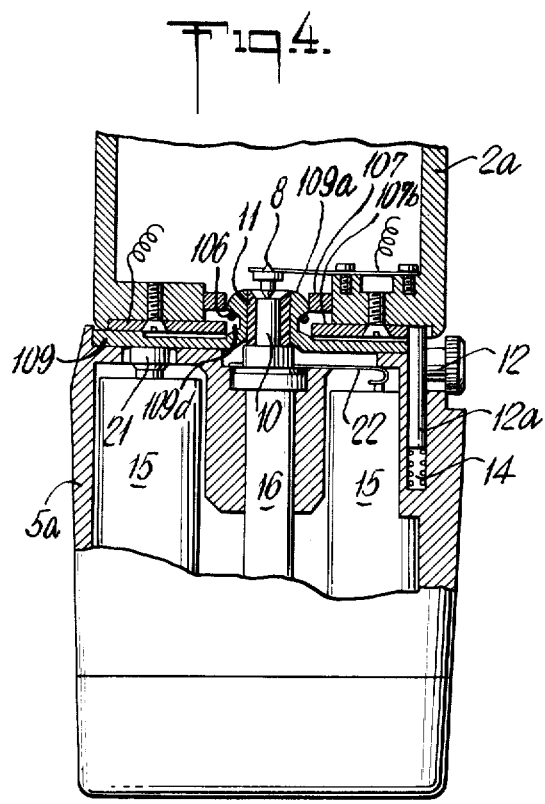
FIG. 4 is a fragmentary longitudinal cross sectional view of the essential parts of a second embodiment of the invention.

Referring now to the drawings, particularly FIGS. 1 to 3 thereof which illustrate a first embodiment of the present invention, shown at 1 is a head portion of the improved flash device, at 1a is a electric cord from the external electric power source (not shown) connected only when the external electric power source is used, at 2 a grip, and at 3 a bracket which holds or carries the grip 2 and couples the flash device to a camera body 4. Shown by broken line in FIG. 1 and designated at 5, is a battery case which may be attached to or detached from the bottom of the grip 2, the battery case being mounted on or connected to the grip to form an integral unit therewith. On the other hand, when the external electric power source is used, the battery case may be detached therefrom, thereby correspondingly reducing the volume and bulk of the flash device, with the resultant improved portability.

As best seen in FIGS. 2 and 3, there is provided a grip body 2a which is tubular and made of insulating material. A bayonet spring 6 and bayonet washer 7 in superimposed position are secured to the bottom of the grip 2a, one on top of the other by means of screws each having an opening with a central portion and opposite wing portions. At least one notched portion 7a in the bayonet washer 7, as shown in FIG. 3, is provided for locking the bayonet therein which will be described hereinafter, thus preventing same from rotation. In the illustrated embodiment, a pair of notched portions are provided. An electric terminal 8 carried by a resilient metal arm is positioned right behind and concentric with the hole 7b in the washer 7, while the bayonet spring 6 serves as the other corresponding electric terminal.

The battery case 5 includes a cylindrical body 5a and is made of insulating material, and a bayonet member 9 is secured to the top of the body 5a by means of screws. The bayonet 9 has a coaxial shank having at its top opposite wing portions or projections 9a adapted to engage with the bayonet spring and an axial bore 9b, in which is fitted an insulating collar 11 telescoped by a contact 10 which is positioned on top of the body 5a of the battery case. A locking member 12 is adapted to lock the bayonet 9 in coupled position and prevent rotation thereof, and the end 12a of the locking member 12 projects upwardly through a hole 9c in the bayonet 9. The locking member 12 is received in a notched portion 13 in the body 5a and is urged upwardly under the influence of a spring 14. Batteries 15 are replacably housed in case 5 and in this embodiment, six dry cells are used. The dry cells are inserted from bottom into the body 5a of the battery case 5 and are retained in position by means of an end cover 18 which is secured to an axial post 16 by means of a screw 17. A plurality of projections 18a of the cover 18 engage grooves 19 in the body 5a of the case to thereby locate the cover 18 in position. Represented by 20, 21 and 22 are contact pieces for the dry cells housed in the case. More specifically, shown at 20 are bridge-contact pieces for connecting adjoining cells, and two bridge pieces (not shown) are provided on the upper portion of the battery case. Shown at 21 is a contact piece which is connected to the bayonnet 9 while a contact piece 22 is connected to the contact 10 in like manner. Accordingly, the output terminals of the battery case consist of lug or wing portions 9a and contact 10.

In operation, in case the internal electric power source is used, the lug portions 9a of the bayonet of the battery case is inserted through hole 7b in the bayonet washer 7 at the bottom of the grip and then the battery case is rotated 90° in either direction. Then, the end portion 12a of the locking member 12 is raised into engagement with either of the notched portions 7a in the bayonet washer 7 by means of the spring action of the spring 14, thereby locking the bayonet in position and preventing it from rotation. When the battery case is thus mounted on the bottom of the grip, the electric terminal 8 contacts the electric contact 10 and the lug portions 9a contacts the bayonet spring 6 under the spring action thereof, whereby the battery case may be concurrently connected with the flash device mechanically and electrically.

In case the internal electric power source is not used, then a locking member 12 as shown in FIG. 2, is slid downwardly to thereby release the locking condition, and the battery case is rotated 90° in either direction, whereby the lug portions 9a of the bayonet may be disengaged from the hole 7b and thus the battery case may be detached from the grip.

As is apparent from the foregoing description, according to this embodiment, the mounting of the battery case on the grip may be carried out rapidly and, when so mounted, the battery case may be attached firmly to the grip as an integral fashion. In addition, the battery case may be rapidly removed merely by releasing the locking member 12 and rotating the battery case 90° in either direction. Furthermore, since one of the electric terminals is positioned at the rotational center of the battery case, accurate alignment of the electric contacts is not required, yet ensuring a positive electrical connection.

Figure 5:
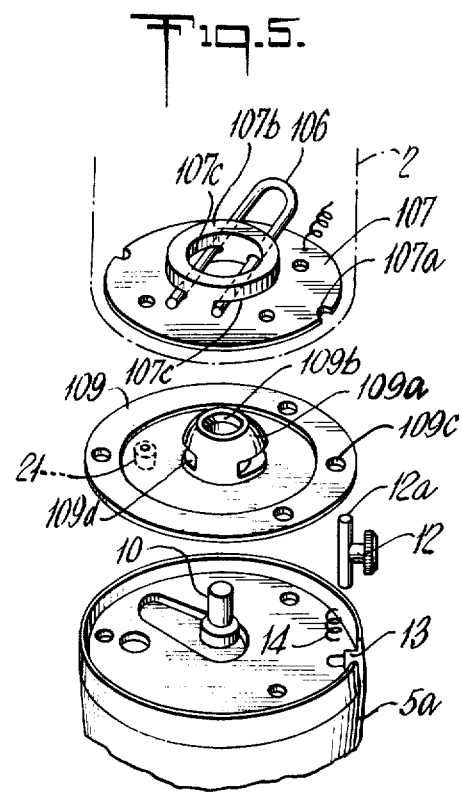
FIG. 5 is an exploded perspective view of the essential parts of the second embodiment of the invention.

FIGS. 4 and 5 illustrate a second embodiment of the invention, and the parts different from those in the first embodiment are designated by reference numerals in the order of 100. As seen in FIGS. 4 and 5, an annular metal plate 107 secured to the bottom 2a of the body of grip by means of screws is formed with an inner coaxial cylindrical or annular portion 107b having a pair of cut-out portions 107c extending from the outer peripheral surface to the inner peripheral surface of the cylindrical portion 107b, and a resilient hair pin spring 106 has opposite legs engaging the cut-out portions 107c in a manner that the spring legs resiliently bear on the root portion of the cylindrical portion 107b from both sides. There are formed in the periphery of plate 107 notched portions 107a for locking purposes, as in the first embodiment. In this embodiment, however, the metal plate 107 serves as the opposite terminal of the electric terminal 8. On the other hand, a metal plate 109 secured by means of screws to the top of the body 5a of the battery case is formed with an upper axial projection tapered at its top and having a center bore 109b therein, through which extends the earlier described contact 10, together with the insulating collar 11. Formed in the sides of the projection are a pair of opposite V-shaped cut-out portions 109d. Provided in the metal plate 109 is a hole 109c, through which the locking member 12 extends, and the contact piece 21 is connected to the plate 109 for attachment. The portions other than those described in connection with the second embodiment are similar in construction to those in the first embodiment.

When the battery case in this embodiment is to be mounted on or connected to the bottom of the grip, the projection 109a is inserted into the cylindrical portion 107b of the metal plate 107 and the hair pin legs 106 engage the projection 109a so as to be spread by sliding along the divergent sloped surfaces of the projection 109a and eventually snap into the V shaped cut-out portions. In case the position of the V shaped cut-out portions is not aligned with that of the hair pin spring 106, the battery case may be rotated in either direction to thereby permit the desired engagement of the hair pin spring legs with the V shape cut-out portions, whereupon the locking member 12 will engage a notched portion 107a, and the battery case is thus positively mounted on the bottom of the grip, while being prevented from rotating. Meanwhile, as to the electrical connection, the electric terminal 8 contacts the contact 10, as in the first embodiment, and the projection 109a of the metal plate, to which contact piece 21 is anchored for attachment, is brought into electrical contact with the metal plate 107 by way of hair pin spring 106.

In case the battery case is to be detached from the bottom of the grip, the locking member is slid downwardly to release the plate 107 from its locked condition, and then the battery case is rotated through about 90° in either direction. This causes the hair pin spring 106 to ride onto the portion 109e free of the V shaped cut-out portions, thus permitting the withdrawal and detachment of the battery case.

In the last embodiment, upon mounting of the battery case, the projection 109a may be oriented in any direction when it is inserted in the cylindrical portion 107b. In addition to this, if a hair pin spring 106 possessing a relatively great resiliency is employed, the battery case may be rotated to automatically assume an optimum position by being urged thereto by the aforesaid resilient hair pin spring. Furthermore, it is possible to dispense with the locking member 12.

Figure 6:
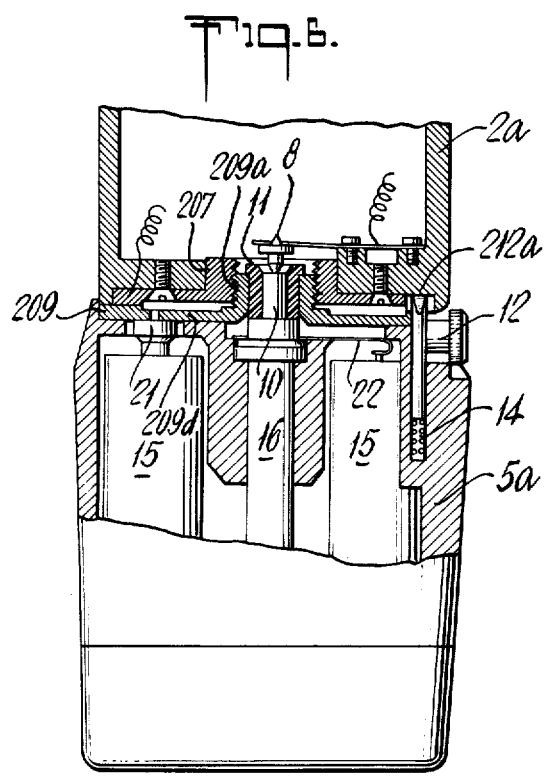
FIG. 6 is a fragmentary longitudinal cross-sectional view of the essential parts of the third embodiment of the invention.
Figure 7:
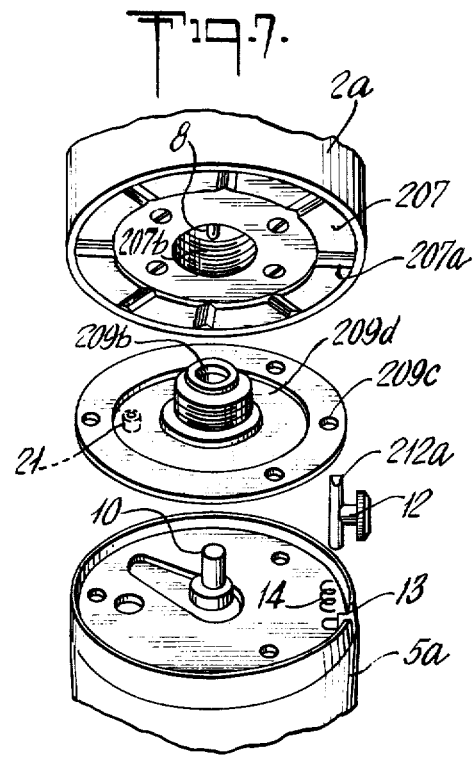
FIG. 7 is a exploded, perspective view of the essential parts of the third embodiment of the invention.

FIGS. 6 and 7 illustrate a third embodiment of the present invention in which the parts which are different from those in the first embodiment are designated by reference numerals of the order of 200, while the similar parts are given the same reference numerals. As seen in FIGS. 6 and 7, an internally threaded collar is provided in the center of a metal plate 207 which is secured to the bottom of the body 2a of the grip by means of screws. A plurality of radially extending grooves 207a are formed in the bottom surface of the grip. The number of the grooves may be reduced as required, or may be such as to present ratchet-like configuration by increasing the number or placing such grooves in side-by-side relation. The metal plate 207 serves as the opposite electric terminal to the electric terminal 8. A metal plate 209 secured by means of screws to the top of the body 5a of the battery case is provided with an externally threaded coaxial projection 209a, said projection having an axial bore 209c therein, through which extends the earlier described contact 10, together with insulating collar 11. The metal plate 209 has a hole 209c in the outer peripheral portion thereof, while the end portion 212a of the locking member 12 is adapted to extend through the hole 209c. The locking member end portion 212a, as shown in FIG. 7, has an inclined pawl defining top surface. The radially intermediate portion 209d of the metal plate 209 has a thickness smaller than the peripheral portion thereof, such that the thread on projection 209a may be moved in a vertical direction relative to the peripheral portion thereof. The contact piece 21 is anchored to the metal plate 209 for attachment. The portions other than those described thus far are similar in construction to those shown in the first embodiment.

When the battery case of the third embodiment of the present invention is mounted on the bottom of the grip, the male thread engages female thread 207b. Since the end or top surface of the end portion 212a of the locking member is inclined in a manner described earlier, the portion 212a will not mesh with the groove 207a when the battery case is rotated in a thread-in direction, thereby causing no interference with the rotation of the battery case. For completing the mounting of battery case, the metal plate 207 is brought into contact with the metal plate 209, and then the battery case is further rotated a small amount until the end portion 212a of the locking member engages one of the grooves 207a. The locking by means of the locking member will prevent the reverse rotation of the battery case, thus presenting no possibility of the loosened thread-connection. At this time, the resiliency of the intermediate portion 209d of the metal plate 209 permits the upward movement of the male thread 209a, when the battery case is rotated after the metal plate 207 has been brought into intimate contact with the metal plate 209. Thus the counter resiliency of the portion 209d ensures the positive contact between the two metal plates, after mounting. The same description as given to the second embodiment may apply to the electric connection in this embodiment.

When the battery case is desired to be detached, the locking member 12 is slid downwardly to release the plate 207 from its lock condition, and the battery case is rotated in a reverse direction to release the thread connection.

As is apparent from the foregoing description on the third embodiment of the invention, the use of screws renders the manufacturing cost lower, while the provision of a combination of a plurality of grooves, locking member 12 having a pawl defining inclined end portion and intermediate portion 209d may preclude the possible loosening of the thread engagement despite the use of screws or threads, after the battery case has been mounted.

Obviously, many modifications and variations of the present invention are possible in the light of the above teachings. It is therefor to be understood that within the scope of the appended claims, the invention may be practiced otherwise than as specifically described.

We claim:

1. An electronic flash device comprising a head and a grip portion and being alternatively powered by self contained batteries or an external power source, and characterized in that said grip portion is divided into a main part and a secondary part which is detachable from said main part; said main part of the grip portion being fixedly connected at one end to said head portion for forming a main body of said device which includes means for connection to the external power source, and a bracket means mounted on said main part for coupling the device to a camera, said main part of the grip portion at the other end being provided with a first connecting member and a first pair of electric terminals; and said secondary part of said grip portion including means for housing the batteries and being provided at one end with a second connecting member separably engageable with said first connecting member for mechanically detachably connecting the secondary part to the main part of the grip portion and a second pair of electric terminals separably coupled with said first pair of electric terminals for supplying said main body with power from the batteries housed in said secondary part of the grip portion through the coupling of the electric terminals.

2. The electronic flash device as in claim 1, wherein said first connecting member includes a female bayonet spring member, and said second connecting member includes a male bayonet member releasably engageable with the bayonet spring member and a locking member for releasably locking the connection between said main and secondary part of said grip portion.

3. The electronic flash device as in claim 2, wherein a first electric terminal of said first pair is located at the center of said other end of said main part of the grip portion and one electric terminal of said second pair is arranged to be located adjacent to the first electric terminal of the first pair in the connected position of said secondary part of the grip portion, and wherein said female and male bayonet members are made of electrically conducting material thereby serving as the other electrical terminals of said first and second pairs.

4. The electronic flash device as in claim 1, wherein said first connecting member includes a collar having at least one resilient member projecting inwardly thereof, and said second connecting member includes a projection having at least one depression at the side face thereof, said resilient member engaging said depression when said projection registers with said collar.

5. The electronic flash device as in claim 1, wherein said first connecting member includes an internally threaded member and plurality of depressions arranged around said threaded member, and said second connecting member includes an externally threaded member and a locking member engageable with one of said depressions for preventing the relative rotation between said threaded members in a loosening direction.

* * * * *